US007090164B2

United States Patent
Akaro et al.

(10) Patent No.: US 7,090,164 B2
(45) Date of Patent: Aug. 15, 2006

(54) METHOD FOR PRODUCING A LIFT AND A HORIZONTAL THRUST

(76) Inventors: Andrey Igorevich Akaro, 1st Priadlinaya ul., d. 7, kv., Moscow 105037 (RU); Anatoly Alekseevich Denisov, ul. Rubinshteina, d. 36, k.v. 49, S.-Peterburg 191002 (RU); Anatoly Mikhailovich Zelinsky, Primorsky prospekt, d. 155, kv. 35, S.-Peterburg 197374 (RU); Mikhail Mikhailovich Medvedev, ul. Naberezhnaya Tsiolkovskogo, d. 18 kv. 134, Mosc.obl, Zhukovsky 140186 (RU)

(*) Notice: Subject to any disclaimer, the term of this patent is extended or adjusted under 35 U.S.C. 154(b) by 3 days.

(21) Appl. No.: 10/511,780
(22) PCT Filed: Apr. 14, 2003
(86) PCT No.: PCT/RU03/00157
§ 371 (c)(1), (2), (4) Date: Oct. 15, 2004
(87) PCT Pub. No.: WO03/086858
PCT Pub. Date: Oct. 23, 2003

(65) Prior Publication Data
US 2005/0178882 A1 Aug. 18, 2005

(51) Int. Cl.
B64C 27/08 (2006.01)
(52) U.S. Cl. .................................. 244/17.23

(58) Field of Classification Search ............. 244/17.23, 244/17.11, 17.19, 17.21
See application file for complete search history.

(56) References Cited

U.S. PATENT DOCUMENTS

| 1,922,167 | A | * | 8/1933 | Leray | 244/6 |
| 2,589,826 | A | * | 3/1952 | Larsen | 416/111 |
| 3,181,816 | A | * | 5/1965 | Pfleiderer | 244/17.17 |
| 3,185,410 | A | * | 5/1965 | Smart | 244/17.23 |
| 3,246,861 | A | * | 4/1966 | Curci | 244/7 A |
| 3,360,219 | A | * | 12/1967 | Wigal | 244/17.23 |
| 3,762,669 | A | * | 10/1973 | Curci | 244/17.23 |

* cited by examiner

Primary Examiner—Tien Dinh

(57) ABSTRACT

A method of producing a lifting force and a horizontal force by aerodynamic surfaces includes the steps of moving aerodynamic surfaces along a circumference and providing their oscillations; rotating each of the aerodynamic surfaces synchronously with the movement along the circumference, in a direction which is opposite to it, relative to an axis of rotation which is parallel to an axis of the movement along the circumference, with an angular speed which is equal to an angular speed of the movement along the circumference, and performing oscillations of each of the aerodynamic surfaces synchronously with a rotation relative to mutually perpendicular axes located correspondingly in two mutually perpendicular planes which intersect along an axis of rotation of the aerodynamic surfaces, wherein one of them passes through an axis of the movement along the circumference and the axis of rotation.

2 Claims, 5 Drawing Sheets

METHOD FOR PRODUCING A LIFT AND A HORIZONTAL THRUST

BACKGROUND OF THE INVENTION

The invention relates to aerodynamics of flying apparatuses and represents a method of producing a lifting force and a horizontal thrust by aerodynamic surfaces, that are driven in movement by a lifting-pulling propulsion device of a flying apparatus.

A method of producing a lifting force and a horizontal thrust by a vane-type carrying screw of a helicopter is known, which includes movement of vanes along a circumference and their oscillation around a longitudinal axis (A. M. Volodko "Helicopter—a Worker and a Soldier", M. Publishing House DOSAAF USSR, 1984, pages 82–83, FIG. 24).

SUMMARY OF THE INVENTION

A disadvantage of the known method is its rather low efficiency of production of a lifting force because the cross-sections of the vanes have different velocities relative to air, the lower the radii of circumferences described by these cross-sections, the lower the speed. As a result, a surface distribution of the aerodynamic force on the vanes appears to be non uniform (close to a square), which significantly reduces the efficiency of this method of producing the lifting force.

A method of producing a lifting force and a horizontal thrust by aerodynamic surfaces (vanes) of a helicopter is known, which includes movement of aerodynamic surfaces along a circumference and their oscillation (W. Johnson "Theory of a Helicopter", V. 1, M, "Mir", 1983, pages 37–38, FIG. 1.6) which is the closes analog.

A disadvantage of this known method is that it has rather low efficiency of producing a lifting force because the cross-sections of the vanes have different velocities relative to air, the lower the radii of circumferences described by these cross-sections, the lower the velocity. As a result, a surface distribution of the aerodynamic force on the vanes appears to be non uniform (close to a square) which significantly reduces the efficiency of this method of producing a lifting force.

As the basis of the invention, an objective of finding a method of producing a lifting force and a horizontal thrust by aerodynamic surfaces is presented, in which a distribution of aerodynamic forces along aerodynamic surfaces which is close to a uniform is provided, that leads to high efficiency of producing both a lifting force and a horizontal thrust.

BRIEF DESCRIPTION OF THE DRAWINGS

The objective of providing a method of producing a lifting force and a horizontal thrust by aerodynamic surfaces is achieved in that in a method of producing a lifting force and a horizontal thrust by aerodynamic surfaces including a movement of the aerodynamic surfaces along a circumference and their oscillation, in accordance with the invention each aerodynamic surface rotates synchronously with the movement along a circumference in an opposite direction relative to an axis of rotation which is parallel to an axis of the movement along the circumference with angular of velocity equal to angular velocity of the movement along a circumference, and the oscillations are performed by each aerodynamic surface synchronously with the movement relative to two mutually perpendicular axes which are located correspondingly in two mutually perpendicular planes that intersect along the axis of rotation of the aerodynamic surface, wherein one of the planes extends through the axis of movement along the circumference and the axis of rotation.

DESCRIPTION OF THE PREFERRED EMBODIMENTS

The rotation of each aerodynamic surface synchronously with the movement along a circumference in an opposite direction relative to the axis of rotation that is parallel to the axis of rotation along the circumference with angular speed equal to angular speed of the movement along the circumference, provides a rectilinear (without rotation) movement of the aerodynamic surface relative to air, which provides a production of a uniform distribution of the aerodynamic forces along an aerodynamic surface, leading to a high efficiency of production of the lifting force.

Performing of oscillations of each aerodynamic surface synchronously with their rotation relative to the mutually perpendicular axes, that are perpendicular to the axis of the movement of the aerodynamic surface along the circumference, provides simultaneously with the lifting force, the production of a horizontal thrust.

Figure 1:
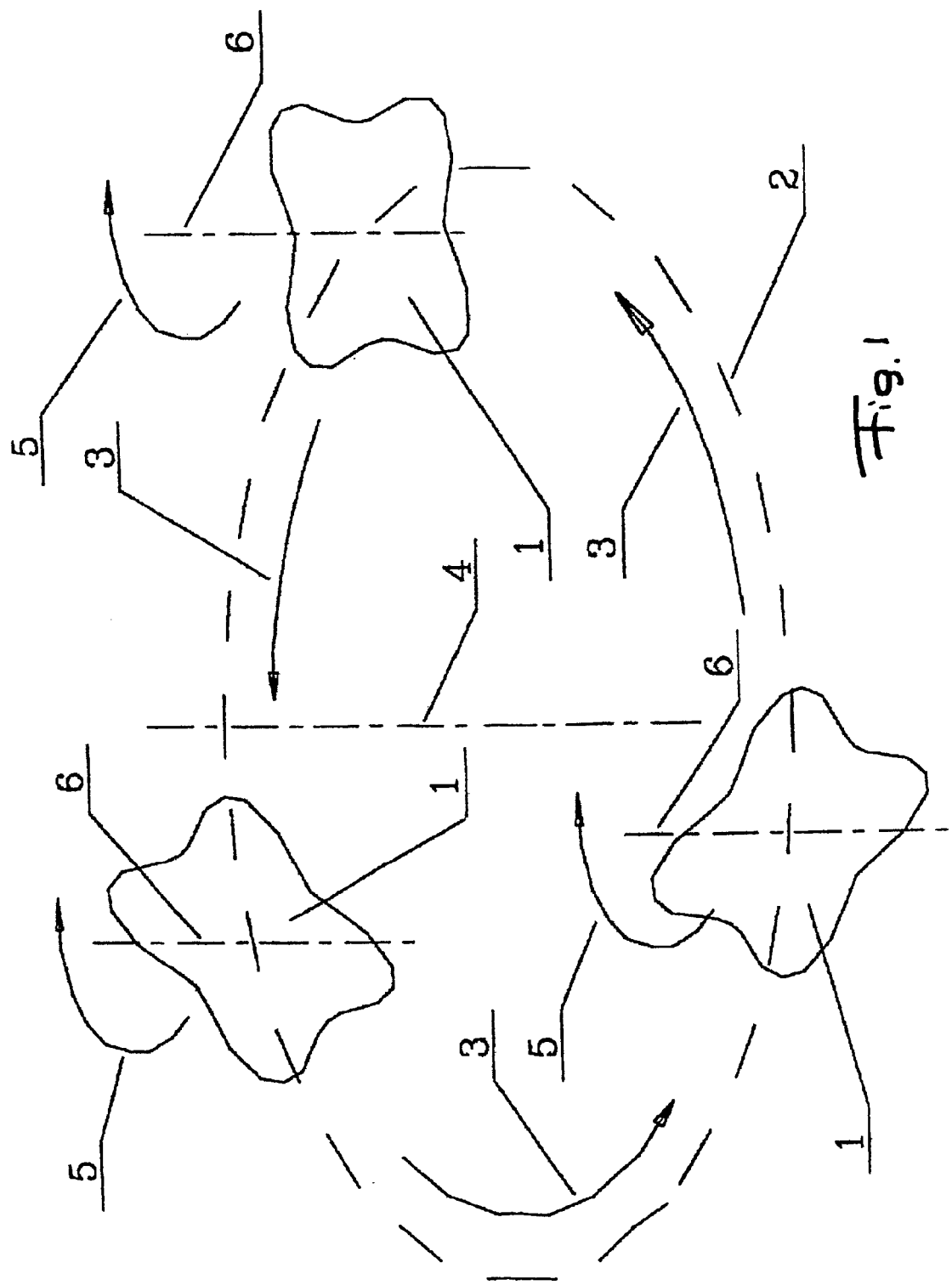
Figure 2:
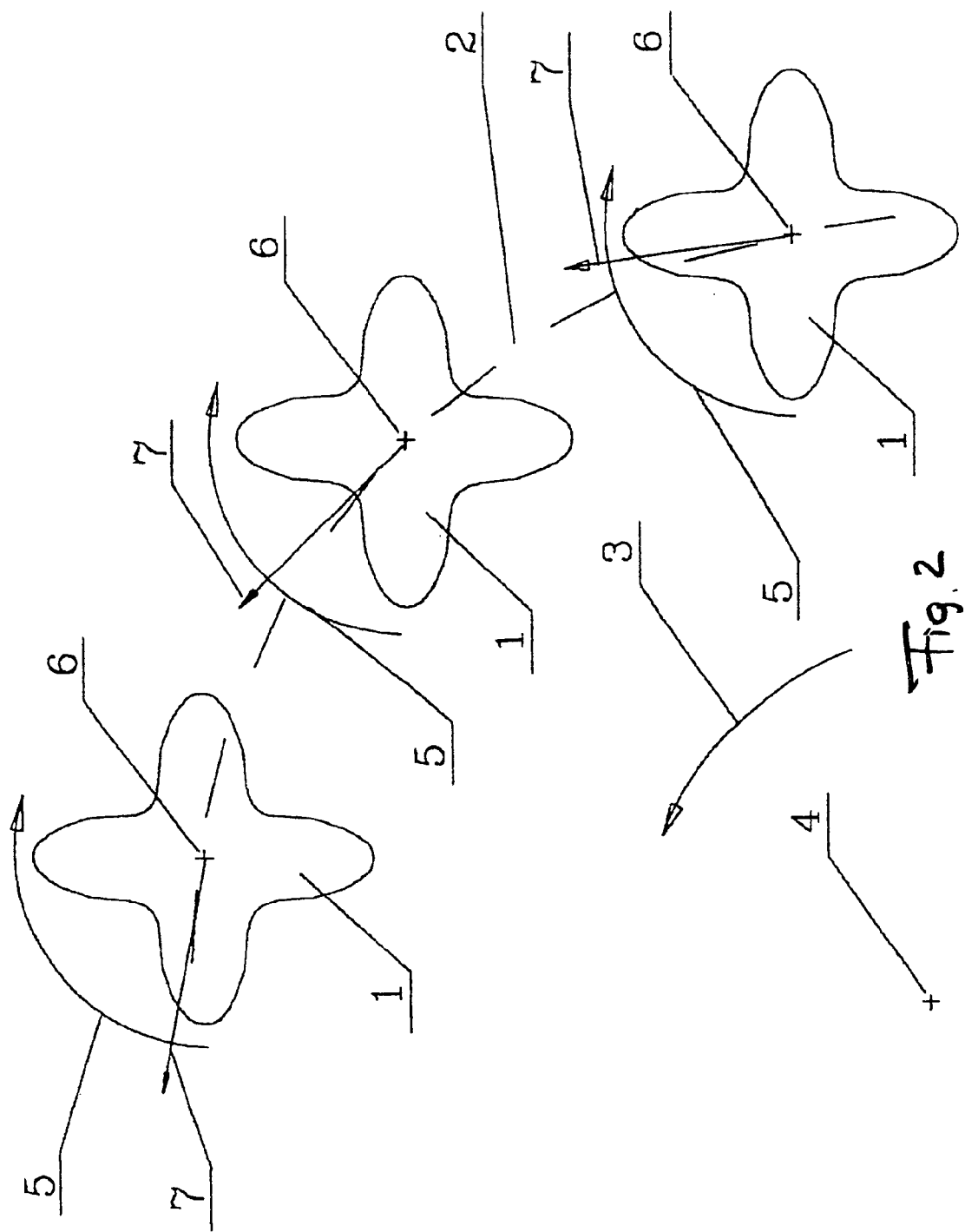
Figure 3:
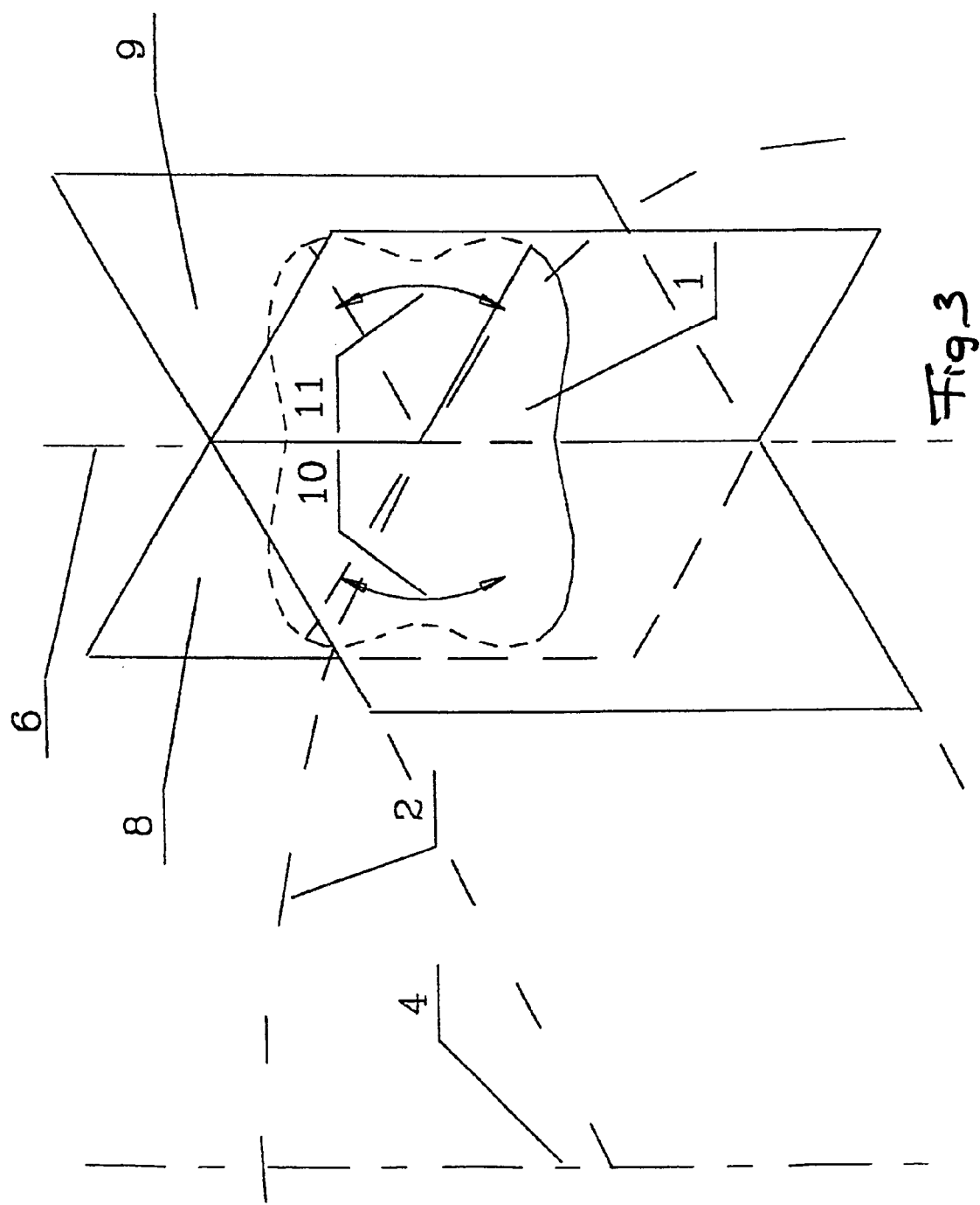
Figure 4:
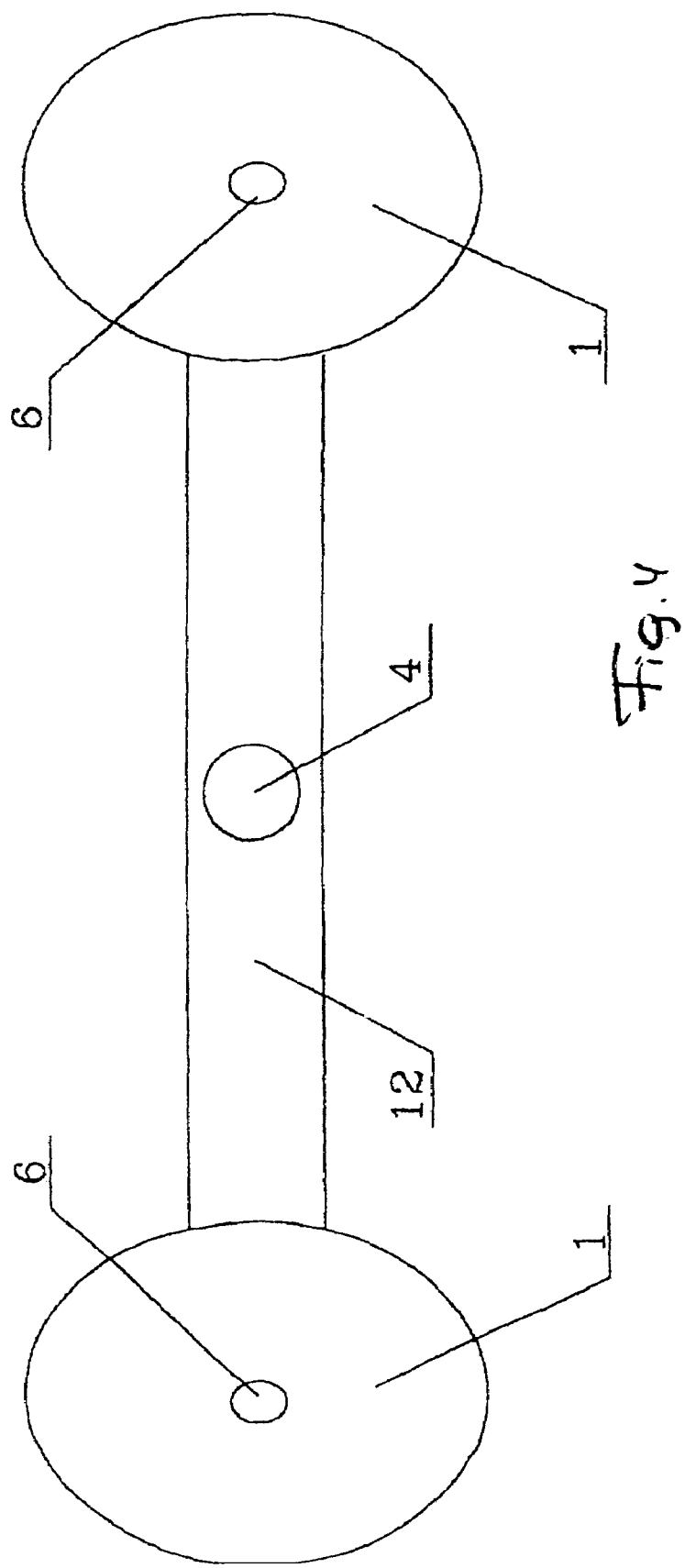
Figure 5:
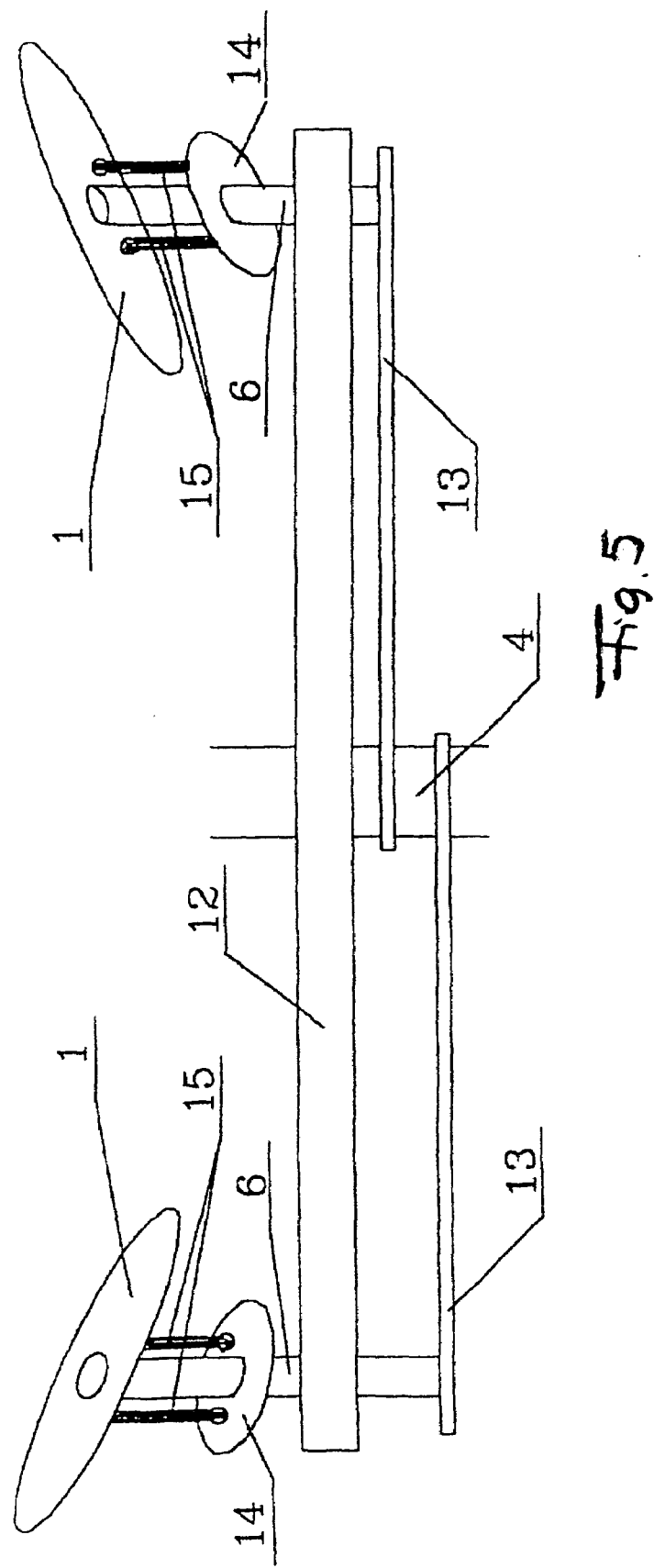

FIG. 1 shows a scheme of production of a rectilinear movement of aerodynamic surfaces;

FIG. 2 are successive positions of an aerodynamic surface during production of a rectilinear movement;

FIG. 3 is a scheme of oscillations of an aerodynamic surface during its movement along a circumference;

FIG. 4 is a view from above on an propulsion device for producing a lifting force and a horizontal thrust by aerodynamic surfaces;

FIG. 5 is a side view of the propulsion device for production of a lifting force and a horizontal thrust by aerodynamic surfaces.

Aerodynamic surfaces 1 move along a circumference 2 in a direction shown by an arrow 3 relative to an axis of movement 4. Each aerodynamic surface 1 rotates synchronously with the movement along the circumference 2, in a direction which is opposite to it, as shown by an arrow 5, relative to an axis 6 of rotation that is parallel to an axis 4 of movement along the circumference 2 with angular velocity equal to angular velocity of the movement along the circumference 2. As a result a rectilinear movement of the aerodynamic surfaces 1 is produced. In three subsequent positions of the aerodynamic surface 1 (FIG. 2), arrows 7 show a vector of an instantaneous average velocity of the aerodynamic surface 1 relative to air. Due to the production of a rectilinear movement of the aerodynamic surfaces 1, velocities of all points of the aerodynamic surfaces 1 are equal, and therefore a deviation of a surface distribution of the aerodynamic force from uniform is determined only by a shape of the aerodynamic surface and is not great. Each aerodynamic surface 1 performs, synchronously with its rotation, oscillations relative to two mutually perpendicular axes which are located correspondingly in two mutually perpendicular planes 8 and 9, that intersect along an axis 6 of rotation of the aerodynamic surfaces 1, wherein one of the planes 9 extends through the axis 4 of the movement along the circumference and the axis 6 of rotation, while the other plane 8 is tangent to the circumference 2 and is parallel to the axis 4 of movement. The direction of these oscillations are conditionally shown by arrows 10 and 11 correspondingly in the planes 8 and 9. Since the aerodynamic surfaces 1 move rectilinearly, the produced lifting force is distributed on them uniformly, which provides a high energy efficiency of the propulsion device. During the oscillations of the aerodynamic surfaces 1 relative to the axes, together with the lifting force also a horizontal thrust is produced, wherein a distribution of the aerodynamic force on the aerodynamic surfaces 1 remains close to uniform.

The number of the aerodynamic surfaces 1 and angular velocities of movement along the circumference by the aerodynamic surfaces 1 and angular velocities of oscillations of the aerodynamic surfaces 1 are selected by experimental-calculating method from conditions of production of a lifting force.

Angles of oscillation of the aerodynamic surfaces 1 are selected by experimental-calculating method from the condition of providing a given horizontal thrust without losing a lifting force. The methods of producing a lifting force and a horizontal thrust by aerodynamic surfaces can be performed, for example, by a propulsion device of a following construction.

The propulsion device is composed of a frame 12 with an immovable axis 4 of movement, two aerodynamic surfaces 1 mounted on the frame 12. A rotation of the frame 12 together with the aerodynamic surfaces 1 relative to the immovable axis 4 of the movement can be performed by means of any mechanical drive, for example, the propulsion device is arranged on the axis 4 of the movement and connected with a spider, on the frame a second spider is fixed, and both spiders are connected by a chain (not shown in the drawings).

A rotation of each aerodynamic surface 1 in an opposite direction with angular velocity equal to angular velocity of rotation of the frame 12 is performed by means of a chain transmission 13 with equal spiders, one of which is arranged on the immoveable axis 4 of movement and connected with the propulsion device, while the other spider is arranged on the axis 6 of the movement, on which the aerodynamic surface 1 is fixed. Both spiders are connected by a chain.

Oscillations of the aerodynamic surfaces 1 are performed by a mechanical copying mechanism which includes a profile disc 14 mounted on an axis of rotation 6, on which the aerodynamic surface 1 is fixed. Vertical plungers-pushers 14 slide on the profiled disc 14 and interact with the aerodynamic surface 1 arranged on a hinge with a possibility of oscillations.

The propulsion device operates in the following manner.

The frame 12 together with the aerodynamic surfaces 1 moves along a circumference relative to the axis 4 of movement by means of a drive with spiders and a chain. Simultaneously each of the two aerodynamic surfaces 1, synchronously with the movement along a circumference, rotates in a direction which is opposite to it relative to the axis 6 of rotation of the parallel axis 4 of movement with angular speed equal to angular speed of movement along the circumference by means of the chain transmission 13. The rotation from the propulsion device is transmitted to the spider and then along the chain to the second spider, to impart rotation to the axis 6 of rotation and the corresponding aerodynamic surface 1 and to provide a rectilinear movement of the aerodynamic surfaces 1. By means of the mechanical copying mechanism, each aerodynamic surface 1 performs, synchronously with rotation, oscillations relative to mutually perpendicular axes, which are located correspondingly in two mutually perpendicular planes, intersecting along the axis of rotation of the aerodynamic surfaces 1, one of which extends through the axis 4 of movement and the axis 6 of rotation. During the implementation of rotation of the axes 6 of rotation and the aerodynamic surfaces 1, the profiled disc 14 rotates and the plunger-pushers 15 slide along the profiled disc 14 and oscillate the aerodynamic surfaces 1 by certain angles so as to provide a production of a horizontal thrust simultaneously with the production of the lifting force.

Example of implementation of the method of producing a lifting force and a horizontal thrust by aerodynamic surfaces.

A propulsion device with two aerodynamic surfaces 1 is used. Each aerodynamic surface 1 moves along a circumference together with the frame 12 relative to the axis 4 of movement by means of a mechanical drive, wherein each aerodynamic surface 1, synchronously with the movement along the circumference rotates in a direction which is opposite to it relative to an axis of rotation of the parallel axis 4 of movement along a circumference with angular velocity equal to angular velocity of movement along a circumference by means of a mechanical drive. Due to the production of rectilinear movement of the aerodynamic surfaces 1, a uniform distribution of aerodynamic forces along the aerodynamic surfaces 1 is provided, which leads to a high efficiency of production of a lifting force. Each aerodynamic surface 1 performs oscillations synchronously with the rotation relative to the two mutually perpendicular axes, that are located correspondingly in two mutually perpendicular planes, intersecting along an axis of rotation of the aerodynamic surfaces 1, wherein one of them extends through the axis 4 of movement along the circumference and the axis 6 of rotation by means of the mechanical copying mechanism, wherein together with a lifting force, a horizontal thrust is produced, whereas the distribution of the aerodynamic force on the aerodynamic surfaces 1 remains uniform.

The proposed method of producing a lifting force and a horizontal thrust by aerodynamic surfaces allows, with the use of the propulsion device, to provide a flight of a flying apparatus with a high energy efficiency.

The invention claimed is:

1. A method for producing a lift and a horizontal thrust by aerodynamic surfaces, comprising the steps of moving the aerodynamic surfaces along a circle around an axis of movement in a predetermined direction; simultaneously rotating each of the aerodynamic surfaces around an axis of rotation which is parallel to said axis of movement in a direction which is opposite to said predetermined direction and with an angular velocity which is equal to an angular velocity of said movement along said circle; an oscillating each of the aerodynamic surfaces simultaneously with said movement and said rotation around two further axes which are perpendicular to one another and located in planes which are perpendicular to one another and intersect one another along a corresponding one of said axes of rotation, wherein one of said planes extends through said axis of movement along the circle and said axis of rotation.

2. A method as defined in claim 1, wherein the other of said planes is parallel to the axis of movement and is tangent to said circle.

* * * * *